United States Patent
Price et al.

(10) Patent No.: US 8,061,722 B2
(45) Date of Patent: Nov. 22, 2011

(54) COLLAPSIBLE DOLLY

(76) Inventors: Nathan L. Price, Sturgeon Bay, WI (US); James T. Jansen, New Franken, WI (US)

( * ) Notice: Subject to any disclaimer, the term of this patent is extended or adjusted under 35 U.S.C. 154(b) by 255 days.

(21) Appl. No.: 12/321,173

(22) Filed: Jan. 16, 2009

(65) Prior Publication Data

US 2010/0181736 A1    Jul. 22, 2010

(51) Int. Cl.
*B62B 3/02* (2006.01)
(52) U.S. Cl. ............ 280/47.18; 280/47.19; 280/47.24; 280/47.29; 280/652; 280/47.33; 280/47.35
(58) Field of Classification Search ........... 280/47.17, 280/47.18, 47.19, 47.24, 47.26, 47.27, 47.28, 280/47.29, 652, 659, 47.33, 47.34, 47.35
See application file for complete search history.

(56) References Cited

U.S. PATENT DOCUMENTS

| | | | |
|---|---|---|---|
| 2,743,115 A * | 4/1956 | Rutledge | ............ 280/42 |
| 3,007,710 A | 11/1961 | Sykes | |
| 3,807,750 A | 4/1974 | Brown | |
| 5,232,232 A | 8/1993 | Kishi | |
| 5,401,043 A * | 3/1995 | Myron | ............ 280/42 |
| D395,120 S | 6/1998 | Newman et al. | |
| 5,833,249 A * | 11/1998 | DeMartino | ............ 280/5.2 |
| 6,095,534 A | 8/2000 | Wong | |
| 6,857,836 B2 | 2/2005 | Keller | |
| 2005/0161915 A1 | 7/2005 | Landefeld | |
| 2008/0203687 A1 | 8/2008 | Meyers et al. | |

FOREIGN PATENT DOCUMENTS

JP    6199241 A    7/1994

OTHER PUBLICATIONS

"Super Mongo Mover" from <http://www.dealassoc.com/super_mongo_mover.htm> visited Dec. 18, 2008, 6 pages.
"Whitney 3280 Double Tier Shopping Cart" from <http://www.comforthouse.com/handtruck.html> visited Dec. 9, 2008, 3 pages.

* cited by examiner

*Primary Examiner* — J. Allen Shriver, II
*Assistant Examiner* — Erez Gurari
(74) *Attorney, Agent, or Firm* — Kinney & Lange, P.A.

(57) ABSTRACT

A collapsible dolly is movable between an extended use position and a compact storage position. The dolly has a right leg and a left leg that form a supportive A-frame when fully extended. Hinges and sliding components are capable of collapsing the dolly into a collapsed position for storage and/or transportation.

17 Claims, 6 Drawing Sheets

COLLAPSIBLE DOLLY

BACKGROUND

The present invention relates to a cart for transporting oversized objects. More particularly, the present invention is a collapsible dolly for transporting large and heavy objects such as, but not limited to, portable toilets.

A hand truck or "dolly" is well known for its usefulness in transporting loads. A dolly can be tailored to meet the needs of a particular industry. For example, U.S. Pat. No. 3,807,750 to Brown discloses a collapsible and adjustable dolly for removing or installing heavy domestic appliances such as ovens and air-conditioners. Similarly, U.S. Pat. No. 6,095,534 assigned to Jasent Inc. and U.S. Pat. No. 5,401,043 to Myron both disclose collapsible luggage carts for transporting luggage through airport terminals. There exists a need for a dolly adapted for transporting portable toilets and other heavy event equipment.

SUMMARY

An exemplary embodiment of the present invention is a collapsible dolly having an A-frame. The A-frame includes an upper end, a lower end, and a center extending between the upper end and the lower end. A handle is connected to the upper end and is capable of sliding downwards toward the A-frame and upwards away from the A-frame. Forks are connected to the lower end and are capable of hinging inward toward the A-frame and outward away from the A-frame. Braces are also attached to the A-frame. Each brace has a first strut attached to the center, a second strut attached to the lower end, and a cross bar extending between the first strut and the second strut. A folding bar extends between the braces and has a hinging center capable of hinging closed to bring the A-frame into a collapsed position for storage and hinging open to bring the A-frame into an extended position for use.

An exemplary embodiment of the present invention is a collapsible dolly movable between an extended use position and a compact storage position. The dolly has a right leg and a left leg, each leg including a top end, a bottom end, and an elongated center located between the top end and the bottom end. A handle block is attached to the top ends of both the right leg and the left leg. A handle is slidingly engaged with the handle block and is capable of sliding away from the legs to an extended position for use and sliding toward the legs into a compact position for storage. A right fork has a hinged attachment to the bottom end of the right leg and a left fork has a hinged attachment to the bottom end of the left leg. Both the right fork and the left fork are capable of hinging open to an extended position for use and hinging closed to a compact position for storage. A right brace includes a first strut having an upper end attached to the elongated center of the right leg, a second strut having an upper end attached near the bottom end of the right leg, and a cross support extending between a lower end of the first strut and a lower end of the second strut. Similarly, a left brace includes a first strut having an upper end attached to the elongated center of the left leg, a second strut having an upper end attached near the bottom end of the left leg, and a cross support extending between a lower end of the first strut and a lower end of the second strut. A folding bar has a right end attached to the right brace, a left end attached to the left brace, and a hinging center capable of hinging open to an extended position for use and hinging closed to a compact position for storage.

DETAILED DESCRIPTION

Figure 1A:
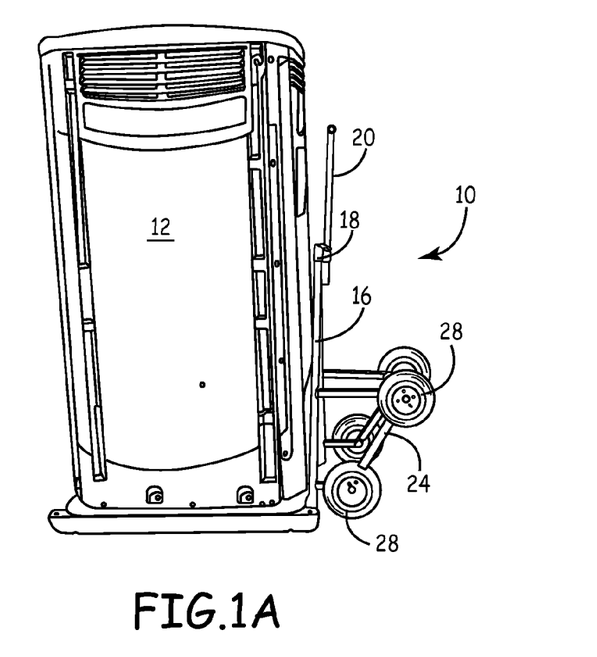
FIG. 1A is a side view and FIG. 1B is a rear view of a collapsible dolly in contact with a portable toilet in accordance with the present invention.
Figure 1B:
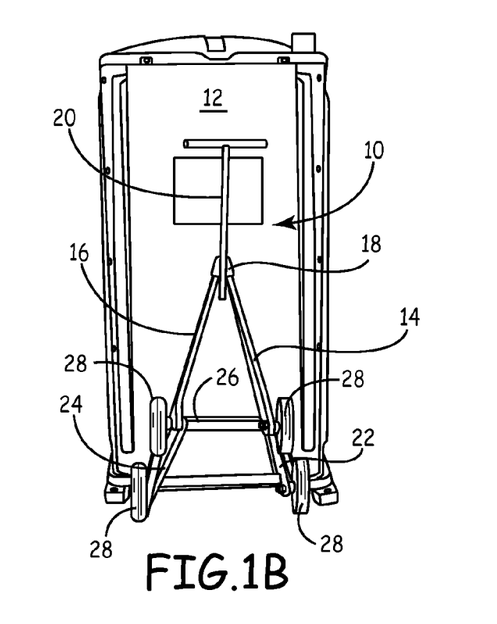

FIG. 1A is a side view and FIG. 1B is a rear view of collapsible dolly 10 in contact with a portable toilet 12. Depicted are collapsible dolly 10, portable toilet 12, right leg 14, left leg 16, handle block 18, handle 20, right brace 22, left brace 24, folding bar 26, and wheels 28. Collapsible dolly 10 is configured to transport heavy and/or large objects such as, but not limited, to portable toilet 12.

Right leg 14 and left leg 16 are attached to handle block 18. Both right leg 14 and left leg 16 extend downwardly and outwardly from handle block 18 to form a supportive A-frame. Also attached to handle block 18, but extending vertically upward in a direction opposite to right leg 14 and left leg 16, is handle 20. Right brace 22 has two attachment points on a backside of right leg 14 such that it forms a U-shape beginning in an approximate middle of right leg 14 and terminating near a bottom of right leg 14. Similarly, left brace 24 has two attachment points on a backside of left leg 16 such that it forms a U-shape beginning in an approximate middle of left leg 16 and terminating near a bottom of right leg 16. Extending between right leg 14 and left leg 16 to attach right brace 22 to left brace 24 is folding bar 26. Wheels 28 are located on right brace 24 and left brace 26. In the embodiment depicted two 10 inch pneumatic wheels 28 are attached to right brace 24 and two 10 inch pneumatic wheels 28 are attached to left brace 26. Collapsible dolly 10 is sized to transport portable toilet 12, although the invention is not so limited.

Right leg 14 and left leg 16 form an A-frame for supporting loads. Handle block 18 or collar contains a top portion of right leg 14 and left leg 16 to form an apex for the A-frame. Handle block 18 also contains a bottom portion handle 20, which is slidingly engaged with handle block 18. Right brace 22 and left brace 24 support right leg 14 and left leg 16 such that a substantial load can be placed on the A-frame formed by right leg 14 and left leg 16. Right brace 22 and left brace 24 also provide attachment locations for wheels 28. Collapsible dolly 10 is depicted adjacent portable toilet 12 and is configured to support the weight of portable toilet 12 once tipped backward so that all wheels 28 are in contact with a floor or ground.

Figure 2A:
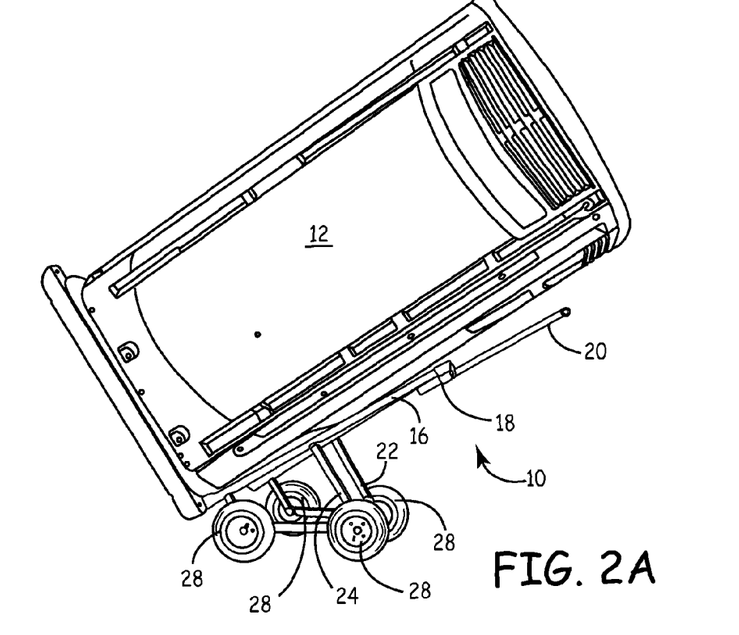
FIG. 2A is a side view and FIG. 2B is a rear view of the collapsible dolly supporting the load of the portable toilet.
Figure 2B:
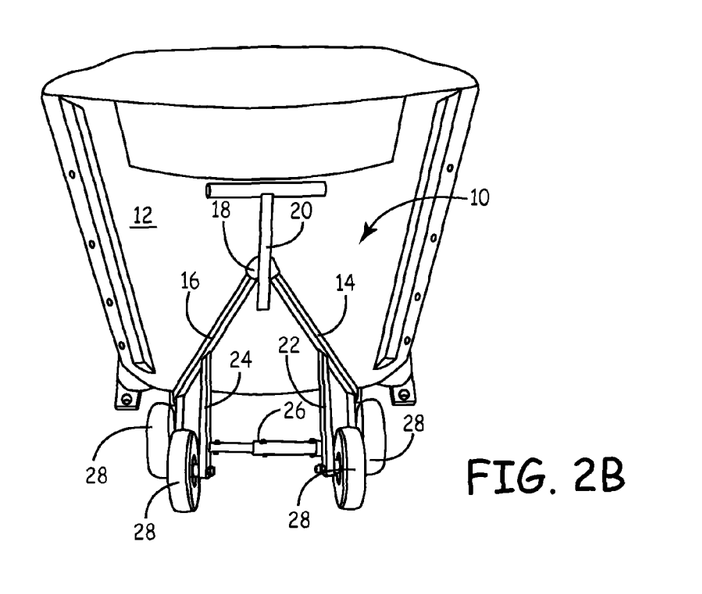

FIG. 2A is a side view and FIG. 2B is a rear view of collapsible dolly 10 supporting the load of portable toilet 12. Depicted are collapsible dolly 10, portable toilet 12, right leg 14, left leg 16, handle block 18, handle 20, right brace 22, left brace 24, folding bar 26, and wheels 28. The arrangement of dolly 10 components and toilet 12 are unchanged from FIGS. 1A & 1B except that dolly 10 is rocked backwards onto all four wheels 28 to support and transport portable toilet 12.

Figure 3:
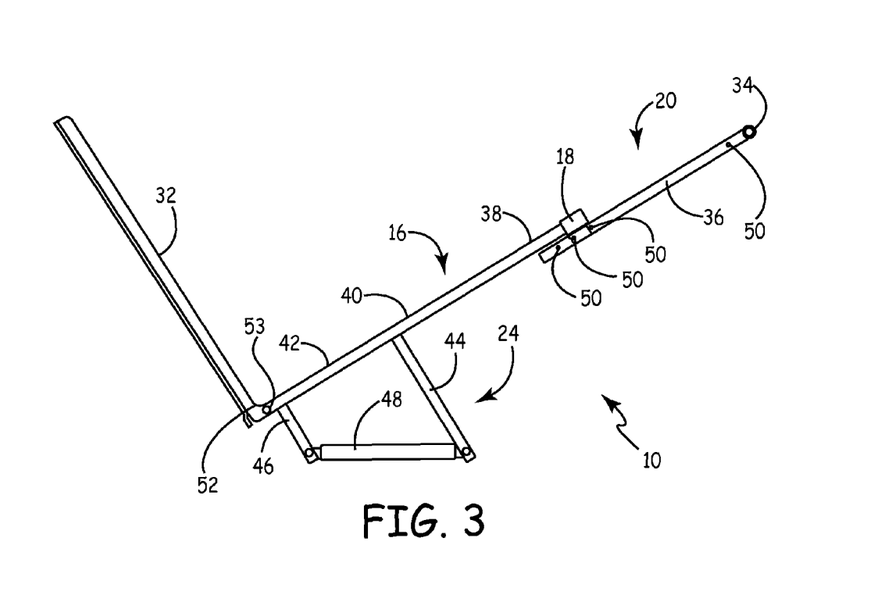
FIG. 3 is a side view of the collapsible dolly (without wheels) in an extended position.

FIG. 3 is a side view of collapsible dolly 10 (without wheels) in an extended position for use in supporting and transporting loads. Depicted are components of collapsible dolly 10 visible from the left side: left leg 16, handle block 18, handle 20, left brace 24, left fork 32, handle grip 34, handle body 36, top left leg 38, center left leg 40, bottom left leg 42, first strut 44, second strut 46, cross brace 48, pin holes 50, and left hinge 52 having left locknut 53. When fully extended and viewed from the left side, collapsible dolly 10 resembles a backwards letter "L".

The uppermost portion of handle 20 is horizontally extending handle grip 34. Extending vertically downwards from handle grip 34 is handle body 36. A bottom portion of handle body 36 is received by handle block 18. Continuing downwards from handle block 18 is left leg 16. Left leg 16 can be divided into top 38, which is attached to handle block 18, elongated center 40, and bottom 42. As indicated by name, elongated center 40 extends between top 38 and bottom 42. Attached to bottom 42 of left leg 16 is left fork 32. When fully extended, left fork 32 forms an approximately 90° angle with left leg 16. Left brace 24 is U-shaped structure attached to left leg 16 with brackets and pins or any other suitable means of attachment. More specifically, first strut 44 is attached to center 40 of left leg 16 at an approximately 90° angle and second strut 46 is attached near bottom 42 of left leg 16 at an approximately 90° angle. Extending between first strut 44 and second strut 46 is cross brace 48. First strut 44 attaches to cross brace 48 at an approximately 60° angle and second strut 46 attaches to cross brace 48 at an approximately 120° angle. Extending through handle body 36 are a plurality of pin holes 50. In the depicted embodiment, three pin holes 50 are shown near a bottom end of handle body 36 and one pin hole 50 is shown near a top of handle body 36, although more or less pin holes 50 are contemplated. Left locknut 53 at left hinge 52 attaches bottom 42 of left leg 16 to left fork 32.

Left fork 32 is movable between an extended position where it forms an approximately right angle with the left leg 16 and a collapsed position where left fork 32 lies adjacent and approximately parallel to left leg 16. Left hinge 52 and left locknut 53 located at the junction of left fork 32 and bottom 42 of left leg 16 allows for left fork 32 to move between the extended and collapsed positions. Handle body 36 is also movable in that it slides upwards and downwards through handle block 18. In FIG. 3, handle 20 is depicted in one of several possible extended positions. Pin holes 50 located along handle body 36 are all possible points of attachment between handle body 36 and handle block 18. In the depicted position, collapsible dolly 10 is configured to support and transport substantial amounts of weight such as, but not limited to, the weight of a portable toilet.

Figure 4:
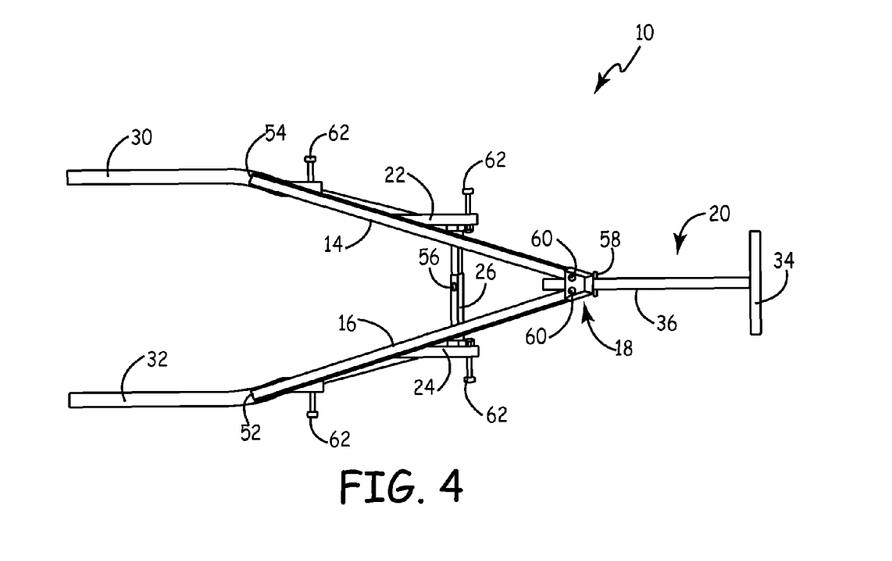
FIG. 4 is a top view of the collapsible dolly (without wheels) in an extended position.

FIG. 4 is a top view of collapsible dolly 10 (without wheels) from FIG. 3. Depicted are the components of collapsible dolly 10 visible from the top: right leg 14, left leg 16, handle block 18, handle 20, right brace 22, left brace 24, folding bar 26, right fork 30, left fork 32, handle grip 34, handle body 36, left hinge 52, right hinge 54, center hinge 56, spring pin 58, screws 60, and truck legs 62. When fully extended and viewed from the top, right leg 14, left leg 16 and folding bar 56 resemble the letter "A".

Handle block 18 is a triangularly shaped box having a top cover plate. Right leg 14 and left leg 16 extend into a bottom side of handle block 18. Vertically extending handle body 36 is attached to an approximate center of horizontally extending handle grip 34 such that handle 20 resembles the letter "T". Spring pin 58 is inserted through one of the plurality of pin holes 50 located along handle body 36. Right fork 30 is attached to right leg 14 by right hinge 54 and left fork 32 is attached to left leg 16 by left hinge 52. Centrally located on folding bar 26 approximately halfway between right brace 22 and left brace 24 is center hinge 56. Securing right leg 14 and left leg 16 to handle block 18 are two screws 60, although more or less screws 60 are possible.

Spring pin 58 secures handle 20 to handle block 18 in either an extended position or a collapsed position. More specifically, spring pin 58 secures handle 20 in one of several extended positions or a collapsed position by restricting movement handle body 36 with respect to handle block 18. Handle body 36 is slid in or out of handle block 18 until handle grip 34 is at a desired height. To secure body 36 at this specific height, spring pin 58 is inserted through the one of pin holes 50 located nearest to a top side of handle block 18. In the embodiment depicted, four pin holes 50 allow for four heights of handle 20 although more or less pin holes 50 are contemplated. Right fork 30 and right hinge 54 operate in the same manner as left fork 32 and left hinge 52 described above. Specifically, right fork 30 unfolds to from an approximately 90° angle with right leg 14 and folds inwards at right hinge 54 to lie adjacent and approximately parallel to right leg 14. Center hinge 56 is depicted in an extended position where right leg 14 and left leg 16 are spaced apart approximately 37° degrees to form the letter "A", but center hinge 56 can be pushed backwards to "break" folding bar 26 into two arms. Once broken at hinge 56, the two arms of folding bar 26 move inwardly toward one another thereby bringing right leg 14 adjacent and approximately parallel to left leg 16. Screws 60 extending through bores in handle block 18 are large enough to allow right leg 14 and left leg 16 to pivot inwardly toward one another and assume their compact position, as well as pivot outwardly away from one another to assume their extended use position. Hinges 52, 54, 56 and spring pin 58 collectively give collapsible dolly 10 the ability to fold inward and assume a compact position ideal for transport and storage.

Figure 5:
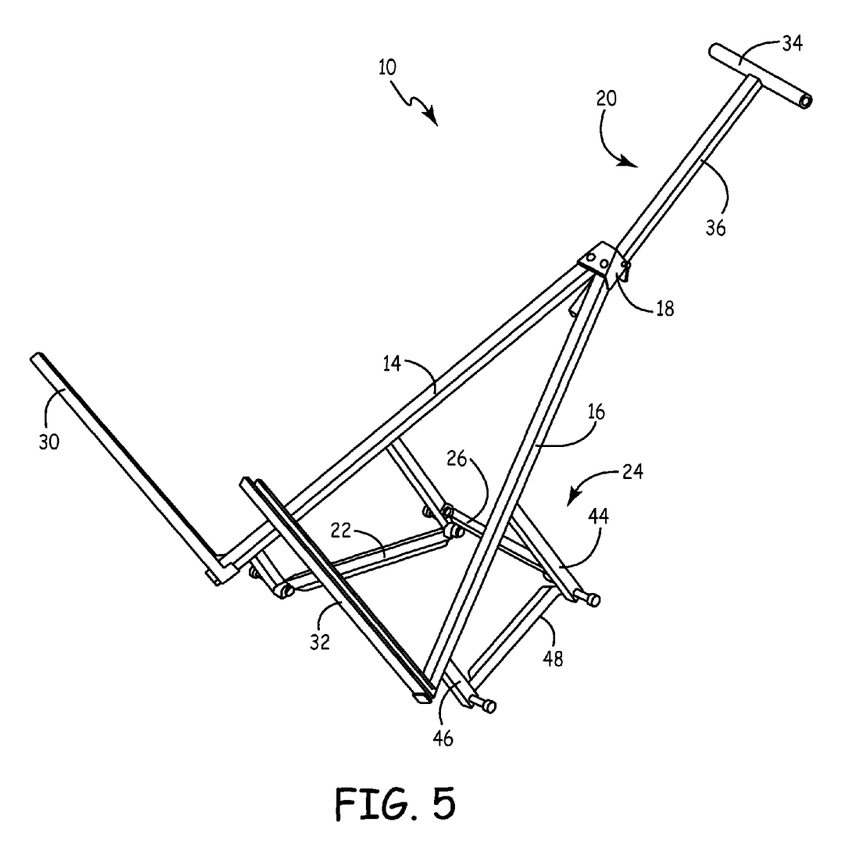
FIG. 5 is a perspective view of the collapsible dolly (without wheels) in an extended position.

FIG. 5 is a perspective view of collapsible dolly 10 (without wheels) from FIG. 2. Depicted are: right leg 14, left leg 16, handle block 18, handle 20, right brace 22, left brace 24, folding bar 26, right fork 30, left fork 32, handle grip 34, handle body 36, first strut 44, second strut 46, and cross brace 48. When fully extended, as depicted in FIG. 5, collapsible dolly 10 is configured to support and transport oversized and/or awkward loads.

The components of collapsible dolly 10 are arranged and functioning as described above with reference to FIGS. 3 & 4. Right leg 14, left leg 16, and handle body 36 can be constructed from squared steel tubes. In the depicted embodiment, right leg 14 and left leg 16 are approximately 45 inches long and handle body 36 is approximately 29 inches long. Handle grip 34 can be constructed from a cylindrical steel tube and have a length of approximately 12 inches. Right brace 22, left brace 24, right fork 30, and left fork 32 can all be constructed from U-channel steel sections. Right brace 22 and left brace 24 should possess the approximately the same dimensions. Namely, first strut 44 can be approximately 17 inches long, second strut 46 can be approximately 7.5 inches long, and cross brace 48 can be approximately 18.5 inches long. Both right fork 30 and left fork 32 can be approximately 43 inches long. The dimensions above are merely exemplary and not to be construed as limiting. So configured, collapsible dolly 10 is sized to support and transport portable toilet 12.

Figure 6A:
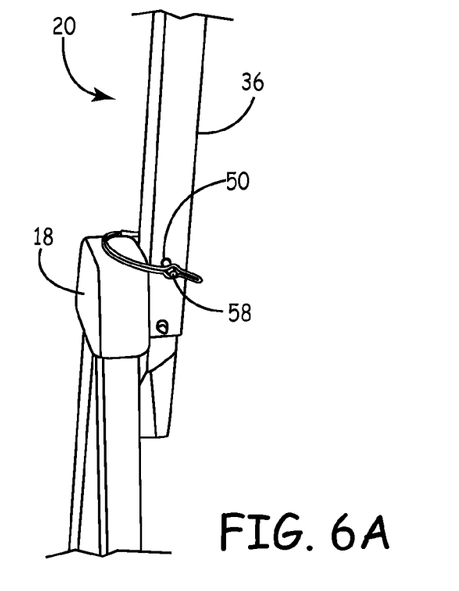
FIGS. 6A-6D are a series of views showing the dolly collapsing into a compact position.
Figure 6B:
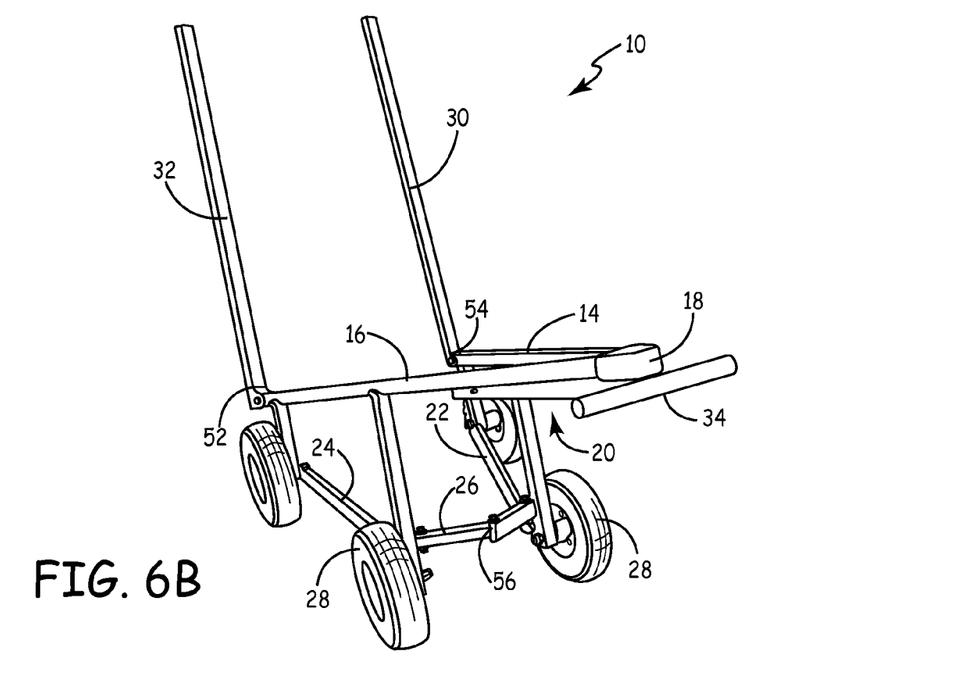
Figure 6C:
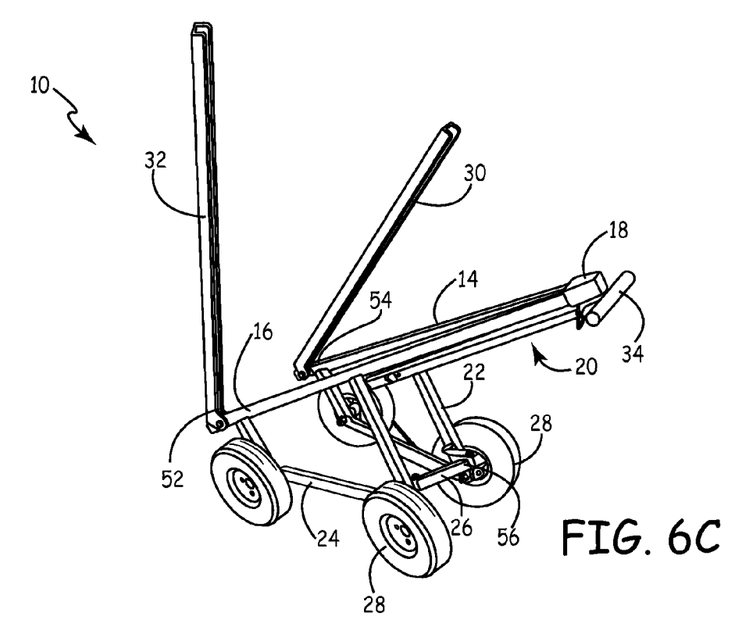
Figure 6D:
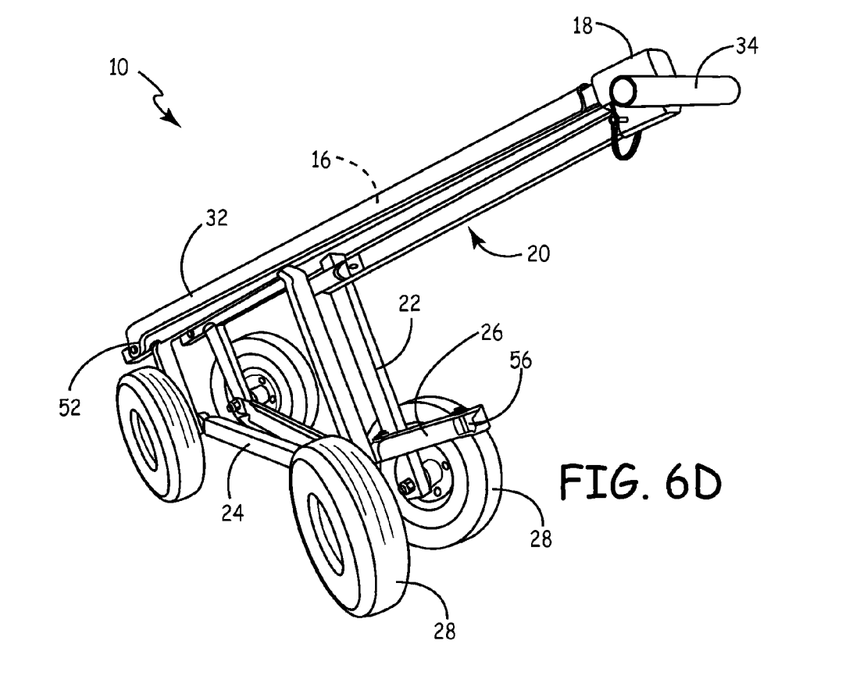

FIGS. 6A-6D are a series showing collapsible dolly 10 collapsing into a compact position for storage. FIG. 6A is a close-up view depicting handle block 18, handle 20, handle body 36, pin hole 50, and spring pin 58. FIGS. 6B-6D are perspective views depicting right leg 14, left leg 16, handle block 18, right brace 22, left brace 24, folding bar 26, wheels 28, right fork 30, left fork 32, handle grip 34, left hinge 52, right hinge 54, and center hinge 56. Viewed in sequence, FIGS. 6A-6D show how one collapses dolly 10 from an extended use position to a collapsed storage position. The reverse is also true, FIG. 6D-6A show how one extends dolly 10 from a collapsed storage position to an extended use position.

The description above with reference to FIGS. 1-5 all depict collapsible dolly 10 in a fully extended position for use in supporting and transporting loads. FIGS. 6A-6D depict how collapsible dolly 10 can be folded to significantly reduce its size. In FIG. 6A, spring pin 58 is inserted through pin hole 50 on handle body 36 adjacent handle block 18. Removal of spring pin 58 from pin hole 50 near a bottom of handle body 36 allows gravity to pull handle body 36 downwards through handle block 18. After handle body 36 ceases downward movement, spring pin 58 is inserted through pin hole 50 near a top of handle body 36 to retain handle 20 in a compact storage position. In FIG. 6B, handle 20 is depicted in this compact storage position. Also in FIG. 6B, center hinge 56 of folding bar 26 is pushed backwards or "broken" such that it is hinging inwards and pulling right brace 22 closer to left brace 24, as well as right leg 14 closer to left leg 16. Center hinge 56, therefore, causes collapsible dolly 10 to collapse about a central axis, much like a child's stroller. In FIG. 6C, right fork 30 is hinging inwards at right hinge 54 toward right leg 14. Similarly, left fork 32 is capable of hinging inwards at left hinge 52 toward left leg 16. FIG. 6D shows collapsible dolly 10 in its compact storage position where center hinge 56, right hinge 54, and left hinge 52 have completed their respective hinging movements. In this collapsed orientation, center hinge 56 has brought right leg 14 next to left 16 and right brace 22 next to left brace 24. Right fork 30 is in contact with and substantially parallel to right leg 14, and left fork 32 is in contact with and substantially parallel to left leg 16. Furthermore, handle 20 is located between right leg 14 and left leg 16. There is no correct or incorrect order in which the steps of folding collapsible dolly 10 should be completed, and the above description is intended to be merely exemplary. The collapsed position of collapsible dolly 10 takes up significantly less space than the extended position and therefore, eases storage and transport needs.

In reverse order, FIGS. 6D-6A depict how collapsible dolly 10 is unfolded from the collapsed storage position to the extended use position. FIG. 6D shows collapsible dolly 10 in its fully collapsed storage position. In FIG. 6C, pushing forwards on center hinge 56 of folding bar 26 will cause center hinge 56 to unhinge thereby pulling right leg 14 and left leg 16 apart, as well as pulling right brace 22 and left brace 24 apart. Pulling outwards on right fork 30 causes right fork 30 to unhinge at right hinge 54 and move away from right leg 14. Similarly, pulling back on left fork 32 causes left fork 32 to unhinge at left hinge 52 and move away from left leg 16. FIG. 6B shows collapsible dolly in an intermediate position between the collapsed storage position and the extended use position. Right fork 30 is almost fully extended so that it forms an approximately right angle with right leg 14 and left fork 32 is almost fully extended so that is forms an approximately right angle with left leg 16. Center hinge 56 can still be pushed further forward so that right leg 14 and left leg 16 are fully extended to form an A-frame and right brace 22 and left brace 24 are fully spaced apart. Lastly, pulling upwardly on handle grip 34 causes handle body 36 to extend out through handle block 18. In FIG. 6A, insertion of spring pin 58 into pin hole 50 secures handle 20 into an extended use position. Just as with collapsing, the steps of extending of dolly 10 from a collapsed position to an extended position can be performed in any order.

Collapsible dolly 10 is movable between an extended use position and a collapsed storage position. The extended use position is configured for supporting and transporting portable toilets and the like on collapsible dolly 10. The collapsed storage position is configured for storage and transportation of collapsible dolly 10. Although the present invention has been described with reference to preferred embodiments, workers skilled in the art will recognize that changes may be made in form and detail without departing from the spirit and scope of the invention.

The invention claimed is:

1. A collapsible dolly comprising:
    an A-frame having an upper end, a lower end, and a center extending between the upper end and the lower end;
    a handle connected to the upper end, the handle capable of sliding downwards toward the A-frame and upwards away from the A-frame;
    forks connected to the lower end, the forks capable of hinging inward toward the A-frame and outward away from the A-frame;
    right and left braces connected to the A-frame, each brace having a first strut attached to the center, a second strut attached to the lower end, and a cross bar extending between the first strut and the second strut;
    right front and right rear wheels mounted to the right brace and left front and left rear wheels mounted to the left brace, the dolly being designed to maneuver under a load with only the right and left front wheels in contact with ground and further designed to support and transport a load by rocking backward onto the right and left braces to engage the right and left rear wheels with the ground; and
    a folding bar extending between the braces, the folding bar having a hinging center capable of hinging closed to bring the A-frame into a collapsed position for storage and hinging open to bring the A-frame into an extended position for use.

2. The collapsible dolly of claim 1, wherein the right brace is attached to a right side of the A-frame and the left brace is attached to a left side of the A-frame.

3. The collapsible dolly of claim 1, wherein the right front wheel is located at a junction of the second strut and the cross bar and the right rear wheel is located at a junction of the first strut and the cross bar.

4. The collapsible dolly of claim 2, wherein the folding bar hinges closed at hinging center such that the right brace and the left brace collapse toward one another for storage.

5. The collapsible dolly of claim 4, wherein the folding bar hinges open at hinging center such that the right brace and the left brace are extended away from one another for use.

6. A collapsible dolly comprising:
    a right leg and a left leg, each leg having a top end, a bottom end, and an elongated center located between the top end and the bottom end;
    a handle block attached to the top ends of both the right leg and the left leg;
    a handle slidingly engaged with the handle block, the handle capable of sliding away from the legs to an extended position for use and sliding toward the legs into a compact position for storage;
    a right fork and a left fork, the right fork having a hinged attachment to the bottom end of the right leg and the left fork having a hinged attachment to the bottom end of the left leg, the right fork and the left fork capable of hinging open to an extended position for use and hinging closed to a compact position for storage;

a right brace including a first strut having an upper end attached to the elongated center of the right leg, a second strut having a upper end attached near the bottom end of the right leg, and a cross support extending between a lower end of the first strut and a lower end of the second strut;

a left brace including a first strut having an upper end attached to the elongated center of the left leg, a second strut having an upper end attached near the bottom end of the left leg, and a cross support extending between a lower end of the first strut and a lower end of the second strut;

a plurality of truck legs extending from the right brace and the left brace;

a right front wheel and a right rear wheel mounted to the truck legs extending from the right brace and a left front wheel and a left rear wheel mounted to the truck legs extending from the left brace, the dolly being configured for maneuvering under a load with only the right front wheel and the left front wheel in contact with ground and further configured for supporting and transporting the load by rocking backward onto left and right braces to engage the right rear wheel and the left rear wheel with the ground; and a folding bar having a right end attached to the right brace, a left end attached to the left brace, and a hinging center capable of hinging open to an extended position for use and hinging closed to a compact position for storage.

7. The collapsible dolly of claim 6, further comprising:
a left screw extending through the handle block and the top end of the left leg; and
a right screw extending through the handle block and the top end of the right leg;
wherein the left screw and right screw allow the left leg and right leg, respectively, to pivot between an open position and a closed position.

8. The collapsible dolly of claim 6, wherein the handle comprises:
a horizontally extending grip; and
a vertically extending body having a top end attached to the grip and a bottom end received by the handle block.

9. The collapsible dolly of claim 8, further comprising:
a retainer pin attaching the handle to the handle block in either the extended position for use or the compact position for storage.

10. The collapsible dolly of claim 9, further comprising:
at least two holes extending through the handle body, a first hole located near the top end for receiving the retainer pin when the handle is in a compact storage position and a second hole located near the bottom end for receiving the retainer pin when the handle is in an extended use position.

11. The collapsible dolly of claim 6, wherein the right fork and the right leg form an approximately 90° angle when in the extended position.

12. The collapsible dolly of claim 11, wherein the right fork folds toward the right leg when hinging closed to the compact position for storage.

13. The collapsible dolly of claim 12, wherein the left fork and the left leg form an approximately 90° angle when assuming the extended position.

14. The collapsible dolly of claim 13, wherein the left fork folds toward the left leg when hinging closed to the compact position for storage.

15. The collapsible dolly of claim 6, further comprising:
locknuts attaching the right fork to the right leg and the left fork to the left leg.

16. The collapsible dolly of claim 6, wherein the folding bar hinges closed at hinging center such that the right leg and the left leg are collapsed toward one another for storage.

17. The collapsible dolly of claim 16, wherein the folding bar hinges open at hinging center such that the right leg and the left leg are extended away from one another for use.

* * * * *